(12) United States Patent
Allgaeuer

(10) Patent No.: US 10,245,918 B2
(45) Date of Patent: Apr. 2, 2019

(54) HEATING SYSTEM FOR A VEHICLE AND METHOD FOR AIR-CONDITIONING A VEHICLE

(71) Applicant: Bayerische Motoren Werke Aktiengesellschaft, Munich (DE)

(72) Inventor: Christian Allgaeuer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/806,486

(22) Filed: Nov. 8, 2017

(65) Prior Publication Data
US 2018/0065444 A1    Mar. 8, 2018

Related U.S. Application Data

(63) Continuation of application No. PCT/EP2016/062433, filed on Jun. 2, 2016.

(30) Foreign Application Priority Data

Jul. 8, 2015 (DE) .................... 10 2015 212 726

(51) Int. Cl.
*B25B 29/00* (2006.01)
*B60H 1/00* (2006.01)
(Continued)

(52) U.S. Cl.
CPC ..... *B60H 1/00385* (2013.01); *B60H 1/00271* (2013.01); *B60H 1/00899* (2013.01);
(Continued)

(58) Field of Classification Search
CPC ............ B60H 1/00385; B60H 1/00271; B60H 1/00899; B60H 1/03; B60H 1/143;
(Continued)

(56) References Cited

U.S. PATENT DOCUMENTS

2011/0308253 A1* 12/2011 Ritter .................... F01K 23/04
                                                      60/661
2012/0160581 A1*  6/2012 Hoess ................ B60H 1/00207
                                                       1/207
(Continued)

FOREIGN PATENT DOCUMENTS

DE    10 2012 010 697 A1    12/2013
DE    10 2013 206 630 A1    10/2014
(Continued)

OTHER PUBLICATIONS

International Search Report (PCT/ISA/210) issued in PCT Application No. PCT/EP2016/062433 dated Sep. 19, 2016 with English translation (Four (4) pages).
(Continued)

*Primary Examiner* — Davis D Hwu
(74) *Attorney, Agent, or Firm* — Crowell & Moring LLP

(57) ABSTRACT

A heating system for a vehicle includes a low-temperature circuit and a high-temperature circuit which can be operated independently of each other and in which a low-temperature cooler or a high-temperature cooler is arranged. The two cooling circuits are coupled to each other via two coupling points for the exchange of coolant, and have a common conduit section, which extends between the two coupling points and on which a heat exchanger is arranged for heating the passenger compartment. A respective heat exchanger is arranged in the two cooling circuits, namely a low-temperature heat exchanger or a high-temperature heat exchanger for receiving waste heat from a respective vehicle component. The cooling circuits can be switched between a cooling operation and a heating operation.

20 Claims, 1 Drawing Sheet

(51) Int. Cl.
  *B60H 1/14* (2006.01)
  *B60H 1/03* (2006.01)
  *B60H 1/32* (2006.01)

(52) U.S. Cl.
  CPC ............... *B60H 1/03* (2013.01); *B60H 1/143* (2013.01); *B60H 1/3227* (2013.01); *B60H 2001/00307* (2013.01); *B60H 2001/00928* (2013.01); *B60H 2001/00949* (2013.01)

(58) Field of Classification Search
  CPC ........ B60H 1/3227; B60H 2001/00307; B60H 2001/00928; B60H 2001/00949; B60H 1/004; B60H 1/00428; F01P 7/14
  USPC .......................................................... 165/63
  See application file for complete search history.

(56) References Cited

U.S. PATENT DOCUMENTS

| | | | |
|---|---|---|---|
| 2012/0247715 A1* | 10/2012 | Renner | B60H 1/00385 165/42 |
| 2016/0031291 A1 | 2/2016 | Enomoto et al. | |
| 2016/0297280 A1 | 10/2016 | Riederer et al. | |
| 2017/0174038 A1 | 6/2017 | Scheldel et al. | |
| 2017/0253105 A1 | 9/2017 | Allgaeuer et al. | |

FOREIGN PATENT DOCUMENTS

| | | |
|---|---|---|
| DE | 102013006356 A1 * | 10/2014 |
| DE | 10 2013 227 034 A1 | 6/2015 |
| DE | 11 2014 001 830 T5 | 12/2015 |
| DE | 10 2014 217 960 A1 | 3/2016 |
| DE | 10 2014 226 346 A1 | 6/2016 |
| WO | WO 2014/162702 A1 | 10/2014 |

OTHER PUBLICATIONS

German-language Written Opinion (PCT/ISA/237) issued in PCT Application No. PCT/EP2016/062433 dated Sep. 19, 2016 (Six (6) pages).

German-language Office Action issued in counterpart German Application No. 10 2015 212 726.5 dated Apr. 7, 2016 (Five (5) pages).

* cited by examiner

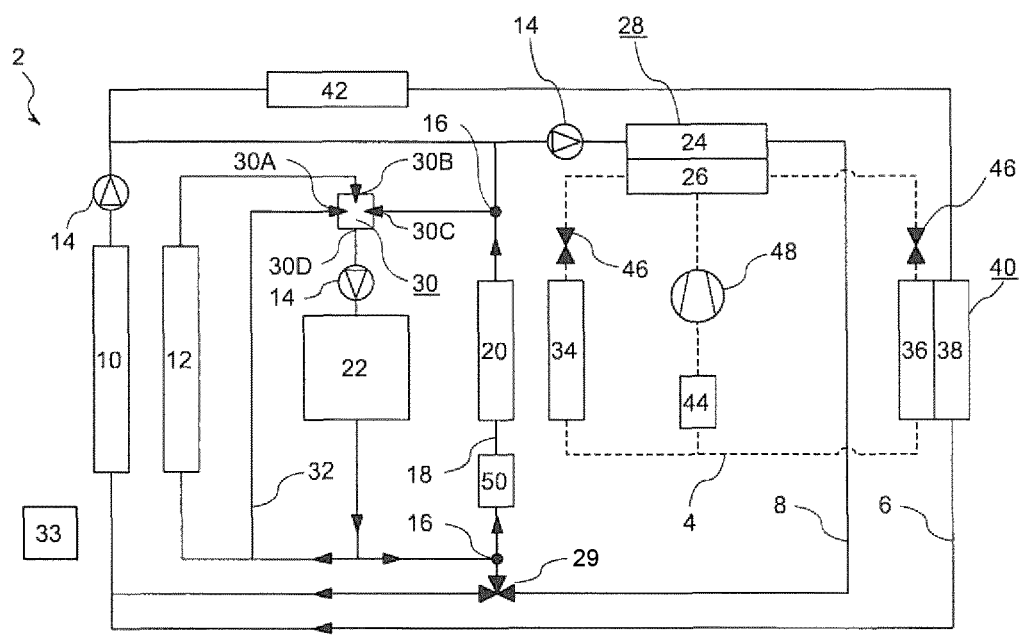

HEATING SYSTEM FOR A VEHICLE AND METHOD FOR AIR-CONDITIONING A VEHICLE

CROSS REFERENCE TO RELATED APPLICATIONS

This application is a continuation of PCT International Application No. PCT/EP2016/062433, filed Jun. 2, 2016, which claims priority under 35 U.S.C. § 119 from German Patent Application No. 10 2015 212 726.5, filed Jul. 8, 2015, the entire disclosures of which are herein expressly incorporated by reference.

BACKGROUND AND SUMMARY OF THE INVENTION

The invention relates to a heat system for a vehicle, in particular for an electric or hybrid vehicle, having a refrigeration circuit, and having two cooling circuits, namely an LT circuit and an HT circuit, which are able to be operated independently of each other and in which there is arranged in each case a cooler, namely an LT cooler and an HT cooler, respectively. The two cooling circuits are coupled to each other via two coupling points for the purpose of exchanging a coolant and have a common line section which extends between the two coupling points and on which, for the purpose of interior compartment heating, a heating heat exchanger is arranged. The invention also relates to a method for air-conditioning a vehicle having such a heat system.

A corresponding heat system is described, for example, in DE 10 2013 227 034 A1.

A heat system serves primarily for the air-conditioning of various vehicle components, for example of a passenger compartment or of a drive component. Removal or supply of heat normally occurs in this case by way of heat exchangers, through which a coolant flows and which, for the purpose of heat exchange, are thermally connected to a respective vehicle component. In this case, high interconnection complexity often results.

In the above-mentioned DE 10 2013 227 034 A1, for example, a thermal management system for an electric or hybrid vehicle is described, which system has two coolant circuits which are able to be operated independently of each other and to which a surroundings heat exchanger is connected in each case. A first cooling circuit serves for the temperature control of electrical components of a drivetrain, and a second cooling circuit is formed for a lower operating temperature and serves for the conditioning of the interior compartment of the vehicle. For the purpose of controlling the temperature of the interior compartment, in the second cooling circuit, there is integrated a heating heat exchanger of a conditioning unit, and also a temperature control device which works in the manner of a heat pump. In a first heating mode, the heating heat exchanger is activated and connected to the first coolant circuit, and in a second heating mode, the temperature control device is activated. In a cooling mode, the two coolant circuits are uncoupled and respectively release heat to the surroundings.

In view of this background, it is an object of the invention to provide a heat system which is as simple as possible in terms of construction and also has the highest possible efficiency. Furthermore, a method for air-conditioning a vehicle having such a heat system is provided.

This and other objects are achieved by a heat system as well as a method of operating the heat system, according to embodiments of the invention. Here, the statements in connection with the heat system also apply analogously to the method, and vice versa.

The heat system is designed for use in a vehicle, in particular in an electric or hybrid vehicle. The heat system has a refrigeration circuit in which a refrigerant circulates and two cooling circuits in which a coolant, for example a water/glycol mixture, circulates. One of the cooling circuits is an LT circuit, that is to say a low-temperature circuit. The other is an HT circuit, that is to say a high-temperature circuit, which typically has a higher coolant temperature than the LT circuit, for example approximately between 90 and 130° C. in comparison with 50 to 90° C. The two cooling circuits are firstly able to be operated independently of each other and, for this purpose, have in particular in each case a pump in order to deliver the coolant. Arranged in the two cooling circuits is additionally in each case an, in particular separate, cooler, namely an LT cooler in the LT circuit and an HT cooler in the HT circuit. The coolers are formed in particular for the purpose of heat exchange with the surroundings, that is to say as surroundings heat exchangers. The two separate coolers are expediently combined to form a common cooler pack.

The two cooling circuits are coupled, in particular hydraulically, to each other via two coupling points for the purpose of exchanging coolant and have a common line section which extends between the two coupling points. Otherwise, the two cooling circuits preferably have no further common line sections. At the coupling points, the two cooling circuits are connected to each other in a particularly simple manner, preferably via T-pieces, such that valves are advantageously omitted. Furthermore, for the purpose of heating an interior compartment, that is to say for the purpose of releasing heat to a passenger compartment of the vehicle, a heating heat exchanger is arranged on the common line section. The two coolers are not arranged on the common line section, but are assigned in each case to one of the cooling circuits.

Furthermore, in the two cooling circuits, there is arranged in each case at least one heat exchanger, namely an LT heat exchanger in the LT circuit and an HT heat exchanger in the HT circuit. The heat exchangers are thermally connected to a respective vehicle component, that is to say are formed for absorbing waste heat of a respective vehicle component. In one variant, multiple vehicle components are connected in this way via a respective heat exchanger to a respective one of the cooling circuits. In this case, the heat exchangers are not arranged on the common line section but outside it, so that, depending on its operating temperature and/or its quantity of generated heat, a respective vehicle component is connected either to the HT circuit or to the NT circuit, but not to both. The vehicle component cooled via the LT circuit is then, for example, a charging electronics unit, an electric motor for driving the vehicle or a high-voltage battery for the energy supply of a drive. The vehicle component cooled via the HT circuit is, for example, an internal combustion engine or an exhaust tract.

The two cooling circuits are in each case, independently of each other, and able to be switched over, that is to say between a cooling mode for releasing the waste heat of the respective vehicle component via the respective cooler and a heating mode for releasing the waste heat of the respective vehicle component via the heating heat exchanger. In the heating mode of the LT circuit, that is to say in an LT heating mode, waste heat of the corresponding vehicle component is absorbed into the LT circuit from the LT heat exchanger and used for interior compartment heating via the heating heat exchanger. In a similar way, in the heating mode of the HT circuit, that is to say in an HT heating mode, waste heat of the other vehicle components is correspondingly absorbed into the HT circuit from the HT heat exchanger and likewise used for heating the interior compartment via the heating heat exchanger. These two heating modes are settable independently of each other, with the result that the interior compartment is thus selectively heated solely via waste heat of one of the vehicle components or of both vehicle components.

In the cooling mode of the LT circuit, that is to say in an LT cooling mode, waste heat of the corresponding vehicle component is then absorbed into the LT circuit from the LT heat exchanger and released to the surroundings via the LT cooler. In a similar way, in the cooling mode of the HT circuit, that is to say in an HT cooling mode, waste heat of the other vehicle component is correspondingly absorbed into the HT circuit from the HT heat exchanger and released to the surroundings via the HT cooler. If both cooling circuits are operated in the respective cooling mode, there is thus no heating of the interior compartment via the heating heat exchanger.

An advantage of the invention is then in particular that particularly efficient air-conditioning occurs by way of the heat system, and at the same time the heat system is particularly simple in terms of construction. Here, an essential core concept is in particular the almost complete separation of the HT circuit and the LT circuit, where "almost complete" is understood to mean in particular a separation apart from the common supply to the heating heat exchanger. The two vehicle components are then advantageously cooled independently of each other in the cooling modes. In particular, in the case of different cooling requirements of the two vehicle components, a respectively optimum coolant stream and a respectively optimum temperature level are then set in the respective cooling circuit. This is particularly advantageous since a certain temperature difference of, for example, approximately 30° C. normally exists between the two cooling circuits.

A further advantage results, in particular, from the fact that, for coupling the two cooling circuits to each other, valves are expediently omitted, as a result of which the heat system as a whole is particularly cost-effective and requires little maintenance. Furthermore, a reduction in installation space and saving of weight also in particular result from this.

Expediently, in the LT circuit, the LT cooler and the heating heat exchanger are connected in parallel with each other. An LT valve is then arranged here for switching over between the heating mode and the cooling mode of the LT circuit. In this configuration, a switchover between the two operating modes is therefore possible by way of just one valve, and so the heat system is, in terms of construction, particularly simple and in particular also requires little maintenance. In a preferred configuration, the LT valve is a 3/2 directional valve which, depending on the operating mode, diverts the coolant from the LT heat exchanger either to the heating heat exchanger or to the LT cooler. In a likewise suitable variant, the LT valve is in the form of a mixing valve such that a first partial stream is guided to the heating heat exchanger and a second partial stream to the LT cooler.

Expediently, in the HT circuit, the HT cooler and the heating heat exchanger are connected in parallel with each other. An HT valve is in this case then arranged for switching over between the heating mode and the cooling mode of the HT circuit. In a similar manner to that described above in relation to the LT valve, in this configuration, a switchover between the two operating modes is therefore possible by way of just one valve, and so the heat system is, in terms of construction, particularly simple and in particular also requires little maintenance. The HT valve too is, in a suitable configuration, a 3/2 directional valve which, depending on the operating mode, allows diversion of the coolant from the HT heat exchanger either via the heating heat exchanger or via the HT cooler. Likewise suitable is a configuration of the HT valve as a mixing valve such that a first partial stream is guided to the heating heat exchanger and a second partial stream to the HT cooler.

A configuration in which both of the above-described parallel connections are present is particularly preferred. The heat system then has three branches which are parallel with respect to one another, wherein a first branch is exclusively part of the LT circuit and contains the LT cooler, a second branch is exclusively part of the HT circuit and contains the HT cooler, and a third branch is the common line section which is both part of the LT circuit and part of the HT circuit and contains the heating heat exchanger. With this configuration, particularly flexible interior compartment heating is realized, in which the heating heat exchanger is supplied with heat in a particularly simple manner either via the LT heat exchanger or via the HT heat exchanger or via both heat exchangers. Moreover, the heat system is particularly simple in terms of construction since only two valves are required in order to switch over the two cooling circuits independently of each other to the respective cooling or heating mode.

In a particularly advantageous configuration, the HT valve is in the form of a mixing valve, also referred to as a heat management module, with a first inlet which is connected to the HT cooler, with a second inlet which is connected to the heating heat exchanger, and with an outlet which is connected to the HT heat exchanger. Such a mixing valve is designed to be particularly favorable in terms of flow and is suitable for high throughflow rates of the coolant, and is thus preferably used in the HT circuit since here, because of the normally relatively high temperature level and a typically relatively high cooling requirement of the connected vehicle component, a correspondingly relatively high cooling power is required. Conventional valves are frequently not suitable, or suitable only to a moderate degree, for this purpose due to a reduction in cross-section. However, a mixing valve has a relatively large cross-section compared to this and thus allows an optimum coolant throughput, preferably of approximately 1000 to 10,000l/h.

The mixing valve has in particular a chamber or a mixing chamber into which the inlets and the outlet open. In this case, "inlet" and "outlet" are to be understood here firstly to generally mean a port of the valve, without thereby necessarily specifying the flow direction. In other words, the HT valve is either arranged upstream of the HT heat exchanger and then combines the partial streams from the HT cooler and from the heating heat exchanger, or is alternatively arranged downstream of the HT heat exchanger so that the coolant flows in via the outlet and is split into partial streams to the HT cooler and to the heating heat exchanger via the inlets. Expediently, precise positioning is realized from design aspects, for example in consideration of available installation space. In order to keep the thermal load on the HT valve due to heated coolant particularly low, the HT valve is expediently arranged upstream of the HT heat exchanger. Likewise, in an expedient refinement, a pump for delivering the coolant is also arranged in the HT circuit upstream of the HT heat exchanger and, in this case, expediently downstream of the HT valve in order to ensure delivery of coolant both in the cooling mode and in the heating mode of the HT circuit.

The inlets and the outlet of the HT valve have in each case a cross-section which is expediently settable. In particular, the various cross-sections are in this case also settable independently of one another, which means that, during operation, an optimum mixing ratio is settable and is also preferably set in order to achieve, for example, specific predefined temperature control of the passenger compartment.

In an advantageous variant, the HT valve has a third inlet which is connected to the HT heat exchanger, whereby a preheating loop is formed, which loop is connected in parallel with the heating heat exchanger and with the HT cooler. As a result, in a preheating mode of the HT circuit, it is in particular possible to preheat the component connected to the HT heat exchanger in that the coolant delivered through the HT heat exchanger is supplied again to the HT heat exchanger via the HT valve. The two other inlets of the HT valve are expediently closed in the preheating mode. In a suitable variant, however, at least the second inlet is at least partially open in order to additionally also realize heating, in particular preheating, of the passenger compartment.

The preheating loop is connected in parallel with the two remaining branches of the HT circuit and thus forms, in particular, a bypass with respect to the HT cooler and to the heating heat exchanger, so that the HT circuit thus has in total three partial circuits with a common section on which the HT heat exchanger is arranged as a common heat source for the requirement-based and particularly flexible distribution of the waste heat generated by the associated vehicle component.

In a preferred configuration, the HT heat exchanger is thermally connected to an internal combustion engine serving as a vehicle component. In other words, the vehicle component connected to the HT heat exchanger is an internal combustion engine of the vehicle. Such an internal combustion engine is normally operated at a high temperature such that the coolant used for cooling has a temperature in the range from approximately 90 to 130° C. An internal combustion engine is therefore expediently cooled via an HT circuit. The heat system described is particularly suitable for cooling an internal combustion engine of a hybrid vehicle or of an electric vehicle having a generator operated by the internal combustion engine since, in this case, the internal combustion engine is normally needed and operated not continuously, but rather only temporarily or at intervals, and thus permanent provision of waste heat for interior compartment heating is not possible. By way of the heat system described here, for the purpose of interior compartment heating, the heating heat exchanger is advantageously supplied with heat via the LT circuit in those cases in which no waste heat is available via the HT circuit.

In a further preferred configuration, connected to the refrigeration circuit is a condenser which is thermally coupled as a vehicle component to the LT heat exchanger for the purpose of transferring heat from the refrigeration circuit into the LT circuit. Instead of releasing the heat of the condenser via the surroundings, it is then advantageously possible to use the heat for heating the interior compartment. Here, the condenser and the LT heat exchanger form in particular a common component, namely a water-cooled refrigerant condenser. The condenser is thus a heat source whose waste heat is introduced into the LT circuit by way of the LT heat exchanger. In the heating mode of the LT circuit, the heat is then supplied to the heating heat exchanger and released therefrom to the passenger compartment.

In a particularly preferred refinement, the condenser forms, together with an auxiliary evaporator, a heat pump, wherein, downstream of the LT cooler, the auxiliary evaporator is thermally coupled to the LT circuit for the purpose of transferring heat from the LT circuit into the refrigeration circuit. In this way, a particularly efficient heat source is realized in the LT circuit by the heat pump. This is available in particular if a heating requirement exists at the heating heat exchanger, but only too little heat or no heat at all is provided via the HT circuit. In this case, heat is then introduced into the LT circuit by way of the heat pump.

The heat pump expediently extracts heat from the surroundings of the vehicle via the LT cooler. For this purpose, the auxiliary evaporator is combined with an auxiliary heat exchanger to form a so-called chiller which serves for transferring heat from the LT circuit into the refrigeration circuit. In addition, the LT cooler is suitably arranged in the LT circuit upstream of the auxiliary heat exchanger. For the interior compartment heating, heat is then firstly absorbed from the surroundings via the LT cooler, and said heat is transferred to a low-pressure side of the refrigeration circuit via the chiller, transferred by way of the condenser and the LT heat exchanger from a high-pressure side of the refrigeration circuit back into the LT circuit, and supplied from there to the heating heat exchanger. In this configuration, the surroundings of the vehicle then serve in particular as a heat reservoir for the heat pump.

In an advantageous variant, arranged in the LT circuit is at least one further LT heat exchanger which serves in particular for cooling a further vehicle component. The cooling correspondingly occurs here at a low temperature level in comparison with the HT circuit, for example at approximately 50 to 90° C. In particular, in the case of an electric or hybrid vehicle, the further vehicle component is then, for example, a power electronics unit, an electric motor for driving the vehicle or a high-voltage battery for supplying energy. The further LT heat exchanger is advantageously connected to the LT circuit upstream of the chiller, to be more precise upstream of the auxiliary heat exchanger of said chiller, and so waste heat of the further vehicle component is likewise transferable to the heating heat exchanger by way of the heat pump. In this case, the further LT heat exchanger is connected in particular downstream of the LT cooler. If, for example, no heat can then be extracted from the surroundings, at least waste heat of the further vehicle component is advantageously available to be transferred to the heating heat exchanger via the chiller and the water-cooled refrigerant condenser.

Suitably connected to the refrigeration circuit is an air-conditioning evaporator which forms, together with the heating heat exchanger, an air-conditioning system. This then advantageously makes it possible for the passenger compartment to be cooled in a way that heat is extracted therefrom by way of the air-conditioning evaporator and is discharged via the refrigeration circuit. In particular, the heat that is extracted in this way is transferred into the LT circuit in a particularly simple manner via the condenser and the LT heat exchanger and is then, for example, released via the LT cooler to the surroundings or, alternatively, used in a reheating or dehumidification mode for the purpose of dehumidifying interior compartment air. For this purpose, the LT valve is then in particular suitably switched over. Accordingly, the combination of condenser and LT heat exchanger advantageously fulfills multiple functions. Firstly, heat is discharged via the LT cooler in the cooling mode of the LT circuit, particularly in the case of interior compartment cooling by way of the air-conditioning evaporator. Secondly, a heat pump is realized in the heating mode of the LT circuit in order to provide heat for the purpose of interior compartment heating. For the dehumidification, that is to say the cooling and reheating, of air, the heating heat exchanger and the air-conditioning evaporator are then expediently operated at the same time.

In a configuration with an air-conditioning evaporator and an auxiliary evaporator, the two evaporators are in particular connected in parallel with each other and then form in each case a loop of the refrigeration circuit. For this purpose, there is arranged downstream of the condenser a branch at which the refrigerant is split between the two evaporators in two partial streams. Upstream of the condenser, in particular upstream of a compressor of the refrigeration circuit, the two partial streams are recombined. In a suitable variant, at least one further evaporator is connected to the refrigeration circuit, specifically in parallel with the air-conditioning evaporator and in parallel with the auxiliary evaporator. This further evaporator serves, for example, for cooling a high-voltage battery of the vehicle.

In order to increase efficiency, in a further variant, there is additionally arranged in the refrigeration circuit an inner heat exchanger which is connected both upstream and downstream of the compressor, as a consequence of which heat exchange is realized between a low-pressure side and a high-pressure side of the refrigeration circuit.

In an advantageous variant, upstream of the heating heat exchanger, a heating element is arranged on the common line section for the purpose of requirement-based, additional heat supply. Consequently, in particular, additional heat is provided if the heating requirement exceeds the maximum amount of heat available from the two cooling circuits. For example, in the case of particularly low ambient temperatures, it is possible that not enough heat can be provided via the heat pump. If at the same time the internal combustion engine is not used, the required heat is then generated by way of the heating element. The heating element is, for example, a PTC heating element or a fuel-powered burner.

In a suitable variant, the heat system has a control unit which is configured for switching over between multiple air-conditioning modes of the heat system, namely a first air-conditioning mode in which both cooling circuits are switched to the respective cooling mode, a second air-conditioning mode in which the LT circuit is switched to the cooling mode and the HT circuit is switched to the heating mode, a third air-conditioning mode in which the LT circuit is switched to the heating mode and the HT circuit is switched to the cooling mode, and a fourth air-conditioning mode in which both cooling circuits are switched to the respective heating mode. Depending on requirement, one of these air-conditioning modes is then set by the control unit. For this purpose, in particular the LT valve and the HT valve are switched over accordingly by the control unit. The multiplicity of air-conditioning modes then allows, for a multiplicity of requirements, an optimum solution in each case, with a simultaneously particularly simple and compact heat system. Here, the multiplicity of air-conditioning modes arises in particular because of the cooling circuits which are able to switch over independently of one another, that is to say in particular because of the valves which are able to switch independently of one another.

Here, the second, third and fourth air-conditioning modes represent in particular in each case an interior-compartment heating mode in which heat is released to the passenger compartment via the heating heat exchanger. The first air-conditioning mode firstly serves primarily for the heat discharge via the two coolers. In one variant, the first air-conditioning mode is at the same time an interior-compartment cooling mode in which the air-conditioning evaporator is additionally activated in order to cool the passenger compartment.

In an expedient refinement, the control unit switches the heat system to a fifth air-conditioning mode, which mode is also referred to as a dehumidification mode and in which mode cooling by way of the air-conditioning evaporator and heating by way of the heating heat exchanger occur at the same time in order to dehumidify the air supplied to the passenger compartment.

Preheating of the vehicle component which is thermally coupled to the HT heat exchanger is in principle possible in each of the air-conditioning modes, that is to say preheating then suitably occurs additionally in one of the air-conditioning modes or alternatively in a separate, sixth air-conditioning mode. For this purpose, the control unit expediently opens the third inlet of the HT valve so that the coolant in the HT circuit is completely or partially supplied directly to the HT heat exchanger.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a schematic view of a heat system for a vehicle.

DETAILED DESCRIPTION OF THE DRAWINGS

FIG. 1 illustrates a heat system 2 for a vehicle (not shown in detail), in particular for a hybrid vehicle. The heat system 2 has a refrigeration circuit 4 and two cooling circuits 6, 8, namely an LT circuit 6 and an HT circuit 8. Both cooling circuits 6, 8 have in each case a separate cooler 10, 12, that is to say the LT circuit 6 has an LT cooler 10 and the HT circuit 8 has an HT cooler 12. The two coolers 10, 12 are in particular combined to form a cooler pack and accommodated, for example, in the front region of the vehicle in order to be acted upon with ambient air during travel.

The two cooling circuits 6, 8 are separated from each other to the greatest possible extent and are able to be operated independently via a respective pump 14. Hydraulic coupling for the purpose of coolant exchange occurs solely via two coupling points 16 between which there extends a common line section 18 which belongs to both cooling circuits 6, 8. All remaining lines are assigned either solely to the LT circuit 6 or solely to the HT circuit 8. Arranged on the common line section 18 is a heating heat exchanger 20 which serves for interior compartment heating, that is to say for the heating of a passenger compartment (not shown in detail) of the vehicle. The heat required for the heating is supplied to the heating heat exchanger 20 via the two cooling circuits 6, 8. Connected to said circuits for this purpose are multiple heat exchangers 22, 24 which are thermally connected thereto for the purpose of cooling vehicle components (not shown). An HT heat exchanger 22, which serves here in particular for the cooling of an internal combustion engine of the vehicle, is thus arranged in the HT circuit 8. An LT heat exchanger 24, which in the exemplary embodiment shown here serves for the cooling of a condenser 26 of the refrigeration circuit 4, is arranged in the LT circuit 6. The LT heat exchanger 24 and the condenser 26 thus form a water-cooled refrigerant condenser 28 by way of which heat is transferred from the refrigeration circuit 4 into the LT circuit 6.

The cooling circuits 6, 8 are in each case, independently of each other, able to be switched over to a heating mode and to a cooling mode, wherein the heat absorbed by a respective heat exchanger 22, 24 is then discharged via the respective cooler 10, 12 in the cooling mode and is supplied to the heating heat exchanger 20 in the heating mode. In this, it is possible for the purpose of interior compartment heating to use, according to requirement, either heat from the LT circuit 6 or from the HT circuit 8 or from both cooling circuits 6, 8.

Two valves 29, 30 are arranged for switching over, namely an LT valve 29 in the LT circuit 6 and an HT valve 30 in the HT circuit 8. In the exemplary embodiment shown here, the LT valve 29 is a 3/2 directional valve which is arranged downstream of the LT heat exchanger 24 and thus allows distribution of the heated coolant over the common line section 18 and to the LT cooler 10. By way of the LT valve 29, a parallel connection of the LT cooler 10 and the heating heat exchanger 20 is then realized.

In a similar way to the LT valve 29, the HT valve 30 allows distribution of the coolant in the HT circuit 8 between the HT cooler 12 and the heating heat exchanger 20 which are thus correspondingly connected in parallel with one another. Additionally, a preheating loop 32 is also formed here in order to return coolant to the HT heat exchanger 22 without releasing heat via the HT cooler 12 or via the heating heat exchanger 20 for the purpose of preheating the vehicle component connected to the HT heat exchanger 22. The HT cooler 12, the heating heat exchanger 20 and the preheating loop 32 are thus connected in parallel with one another and correspondingly form three parallel branches of the HT circuit 8, which branches are each suppliable with heat via the HT heat exchanger 22.

In the embodiment variant shown here, the HT valve 30 is in the form of a mixing valve, that is to say is formed here as a so-called heat management module, with multiple inlets 30A, 30B, 30C for in each case one of the parallel branches and with an outlet 30D. The mixing valve is designed for particularly high throughflow rates of coolant, for example of approximately 5,000 l/h, and includes a mixing chamber into which the inlets 30A, 30B, 30C and the outlet 30D open. The inlets 30A, 30B, 30C are in each case settable independently of one another, and so the quantity of coolant in the parallel branches of the HT circuit 8 is able to be set optimally. For interior compartment heating, the inlet 30C is opened, for heat discharge via the HT cooler 12, the inlet 30B is opened, and for preheating, the inlet 30A is opened. In this case, a mixed setting, in which a plurality of the inlets 30A, 30B, 30C are fully or partially open, is in principle possible.

The heat system 2 consequently has at least four air-conditioning modes which arise from the combinations of the two heating and cooling modes and which are set by a control unit 33. For this purpose, the control unit 33 sets in particular the valves 29, 30. In the first air-conditioning mode, coolant is passed on by way of the valve 29, 30 to the respective cooler 10, 12. In the second air-conditioning mode, by contrast, the HT circuit 8 is switched to the heating mode, and the HT valve 30 guides the coolant to the heating heat exchanger 20. In the third air-conditioning mode, the HT circuit 8 is in the cooling mode, and in the LT circuit 6, the coolant is guided, by way of the LT valve 29, through the heating heat exchanger 20 instead of via the LT cooler 10. In the fourth air-conditioning mode, the two valves 29, 30 are then set such that, in each case, a diversion occurs via the heating heat exchanger 20 and not via the respective cooler 10, 12. In the LT circuit 6 only, coolant is supplied to the LT cooler 10 in a parallel manner with respect to the LT valve 29 for the purpose of heat extraction from the surroundings and the realization of a heat pump function.

In addition to the condenser 26, the refrigeration circuit 4 has two evaporators 34, 36, namely an air-conditioning evaporator 34 which forms, together with the heating heat exchanger 20, an air-conditioning system of the vehicle, and an auxiliary evaporator 36 which is connected in parallel with the air-conditioning evaporator 34 in the refrigeration circuit 4. The auxiliary evaporator 36 is combined with an auxiliary heat exchanger 38 to form a chiller 40 in order to transfer heat according to requirement by way of the auxiliary heat exchanger 38 from the LT circuit 6 into the refrigeration circuit 4. In this way, the condenser 26 and the auxiliary evaporator 36 then form a heat pump which serves as a heat source and, in the heating mode of the LT circuit 6, provides heat for the purpose of interior compartment heating. The heat pump extracts the heat from the surroundings of the vehicle, for example, via the LT cooler 10. Alternatively, in the LT circuit 6, a further LT heat exchanger 42, which serves for cooling a further vehicle component, is connected in parallel with the LT heat exchanger 24. Moreover, the further LT heat exchanger 42 is arranged downstream of the auxiliary heat exchanger 38, and so the heat absorbed from the LT heat exchanger 24 is, in addition or as an alternative to the heat from the LT cooler 10, transferred via the chiller 40 into the refrigeration circuit 4.

The refrigeration circuit 4 furthermore includes a compressor 44 which is upstream of the condenser 26, two expansion elements 46 which are respectively upstream of the evaporators 34, 36, and a refrigerant collector 48 which is upstream of the compressor 44, that is to say on a low-pressure side of the refrigeration circuit 4. Alternatively, the refrigerant collector 48 is arranged on the high-pressure side, that is to say downstream of the compressor 44.

If at the heating heat exchanger 20, more heat is required than is available via the two cooling circuits 6, 8 in the manner described above, an additional heating element 50, which is arranged on the common line section 18 upstream of the heating heat exchanger 20, is activated. The heating element 50 is, for example, a PTC heating element or a burner.

LIST OF REFERENCE SIGNS

2 Heat system
4 Refrigeration circuit
6 LT circuit
8 HT circuit
10 LT cooler
12 HT cooler
14 Pump
16 Coupling point
18 Common line section
20 Heating heat exchanger
22 HT heat exchanger
24 LT heat exchanger
26 Condenser
28 Water-cooled refrigerant condenser
29 LT valve
30 HT valve
30A, 30B, 30C Inlet
30D Outlet
32 Preheating loop 33 Control unit
34 Air-conditioning evaporator
36 Auxiliary evaporator
38 Auxiliary heat exchanger
40 Chiller
42 Further LT heat exchanger
44 Compressor
46 Expansion element
48 Refrigerant collector
50 Heating element The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A heat system for a vehicle, comprising:
    a refrigeration circuit; and
    two cooling circuits which are an LT circuit and an HT circuit which are operable independently of each other and in which there is arranged in each case a cooler, which are an LT cooler and an HT cooler, respectively, wherein
    the two cooling circuits are coupled to each other via two coupling points for the purpose of exchanging a coolant and have a common line section which extends between the two coupling points and on which, for the purpose of heating an interior compartment, a heating heat exchanger is arranged,
    in the two cooling circuits, there is arranged in each case a heat exchanger, which are an LT heat exchanger and an HT heat exchanger, respectively, for absorbing a waste heat of a respective vehicle component, and
    the two cooling circuits are in each case, independently of each other, switchable over between a cooling mode for releasing the waste heat of the respective vehicle component via the respective cooler and a heating mode for releasing the waste heat of the respective vehicle component via the heating heat exchanger.

2. The heat system according to claim 1, wherein in the LT circuit, the LT cooler and the heating heat exchanger are connected in parallel with each other and an LT valve for switching over between the heating mode and the cooling mode of the LT circuit is arranged.

3. The heat system according to claim 1, wherein in the HT circuit, the HT cooler and the heating heat exchanger are connected in parallel with each other and an HT valve for switching over between the heating mode and the cooling mode of the HT circuit is arranged.

4. The heat system according to claim 3, wherein the HT valve is in the form of a mixing valve with a first inlet which is connected to the HT cooler, with a second inlet which is connected to the heating heat exchanger, and with an outlet which is connected to the HT heat exchanger.

5. The heat system according to claim 4, wherein the HT valve includes a third inlet which is connected to the HT heat exchanger, whereby a preheating loop is formed, which loop is connected in parallel with the heating heat exchanger and with the HT cooler.

6. The heat system according to claim 1, wherein the HT heat exchanger is thermally connected to an internal combustion engine serving as a vehicle component.

7. The heat system according to claim 5, wherein the HT heat exchanger is thermally connected to an internal combustion engine serving as a vehicle component.

8. The heat system according to claim 1, wherein a condenser is connected to the refrigeration circuit, the condenser being thermally coupled as a vehicle component to the LT heat exchanger for the purpose of transferring heat from the refrigeration circuit into the LT circuit.

9. The heat system according to claim 2, wherein a condenser is connected to the refrigeration circuit, the condenser being thermally coupled as a vehicle component to the LT heat exchanger for the purpose of transferring heat from the refrigeration circuit into the LT circuit.

10. The heat system according to claim 8, wherein the condenser forms, together with an auxiliary evaporator, a heat pump, whereby, downstream of the LT cooler and/or a further LT heat exchanger, the auxiliary evaporator is thermally coupled to the LT circuit for the purpose of transferring heat from the LT circuit into the refrigeration circuit.

11. The heat system according to claim 9, wherein the condenser forms, together with an auxiliary evaporator, a heat pump, whereby, downstream of the LT cooler and/or a further LT heat exchanger, the auxiliary evaporator is thermally coupled to the LT circuit for the purpose of transferring heat from the LT circuit into the refrigeration circuit.

12. The heat system according to claim 1, wherein an air-conditioning evaporator is connected to the refrigeration circuit, whereby the air-conditioning evaporator forms, together with the heating heat exchanger, an air-conditioning system.

13. The heat system according to claim 11, wherein an air-conditioning evaporator is connected to the refrigeration circuit, whereby the air-conditioning evaporator forms, together with the heating heat exchanger, an air-conditioning system.

14. The heat system according to claim 1, wherein, upstream of the heating heat exchanger, a heating element is arranged on the common line section for the purpose of additional heat supply on a required basis.

15. The heat system according to claim 13, wherein, upstream of the heating heat exchanger, a heating element is arranged on the common line section for the purpose of additional heat supply on a required basis.

16. The heat system according to claim 1, further comprising:
    a control unit which is configured for switching over between multiple air-conditioning modes, wherein the multiple air-conditioning modes include
        a first air-conditioning mode in which the two cooling circuits are switched to the respective cooling mode,
        a second air-conditioning mode in which the LT circuit is switched to the cooling mode and the HT circuit is switched to the heating mode,
        a third air-conditioning mode in which the LT circuit is switched to the heating mode and the HT circuit is switched to the cooling mode, and
        a fourth air-conditioning mode in which the two cooling circuits are switched to the respective heating mode.

17. The heat system according to claim 15, further comprising:
    a control unit which is configured for switching over between multiple air-conditioning modes, wherein the multiple air-conditioning modes include
        a first air-conditioning mode in which the two cooling circuits are switched to the respective cooling mode,
        a second air-conditioning mode in which the LT circuit is switched to the cooling mode and the HT circuit is switched to the heating mode, a third air-conditioning mode in which the LT circuit is switched to the heating mode and the HT circuit is switched to the cooling mode, and a fourth air-conditioning mode in which the two cooling circuits are switched to the respective heating mode.

18. The heat system according to claim 1, wherein the vehicle is an electric or hybrid vehicle.

19. A method for air-conditioning a vehicle via a heat system, the heat system comprising:

a refrigeration circuit; and two cooling circuits which are an LT circuit and an HT circuit which are operable independently of each other and in which there is arranged in each case a cooler, which are an LT cooler and an HT cooler, respectively, wherein the two cooling circuits are coupled to each other via two coupling points for the purpose of exchanging a coolant and have a common line section which extends between the two coupling points and on which, for the purpose of heating an interior compartment, a heating heat exchanger is arranged, in the two cooling circuits, there is arranged in each case a heat exchanger, which are an LT heat exchanger and an HT heat exchanger, respectively, for absorbing a waste heat of a respective vehicle component, and the two cooling circuits are in each case, independently of each other, switchable over between a cooling mode for releasing the waste heat of the respective vehicle component via the respective cooler and a heating mode for releasing the waste heat of the respective vehicle component via the heating heat exchanger, the method comprising:

heating a passenger compartment of the vehicle by way of the LT circuit and/or the HT circuit being switched over to the respective heating mode.

20. The method according to claim 19, wherein the vehicle is an electric or hybrid vehicle.

* * * * *